United States Patent [19]

Creaser

[11] Patent Number: 4,569,008
[45] Date of Patent: Feb. 4, 1986

[54] TAIL LIGHT ASSEMBLY

[76] Inventor: Kenneth J. Creaser, 7 Nunyara Crescent, Belair, State of South Australia, Australia

[21] Appl. No.: 733,137

[22] Filed: May 10, 1985

[30] Foreign Application Priority Data

May 11, 1984 [AU] Australia ............................ PG4962

[51] Int. Cl.[4] .......................... A47G 33/16; F21P 1/02
[52] U.S. Cl. ...................................... 362/362; 362/61; 362/257; 362/368
[58] Field of Search ................. 362/362, 257, 61, 368, 362/374, 80

[56] References Cited

U.S. PATENT DOCUMENTS 3,184,590 5/1965 Nagel ................................. 362/362

Primary Examiner—E. Rollins Cross
Attorney, Agent, or Firm—Brown, Martin & Haller

[57] ABSTRACT

A tail light assembly having a number of closely spaced Z-shaped projections on the base of a tail light assembly project radially inwardly towards a sealing ring, and are engaged by a corresponding number of lugs surrounding a tail light lens, to form a bayonet cap join wherein the pressure is distributed around the periphery of the lens, engaging the lens into sealing contact with the sealing ring.

6 Claims, 7 Drawing Figures

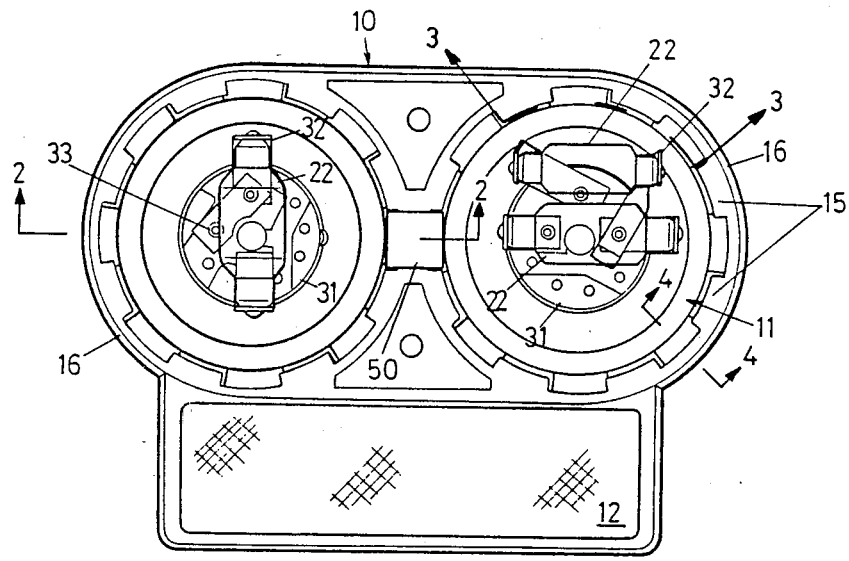
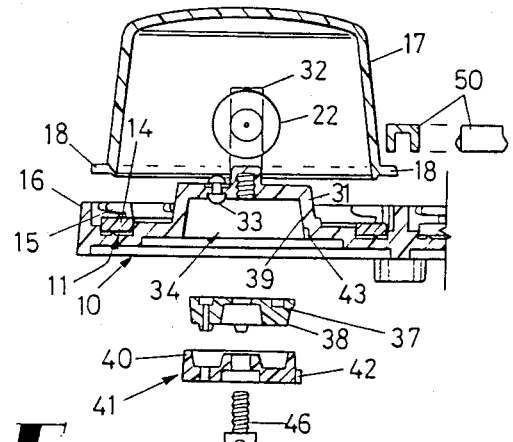
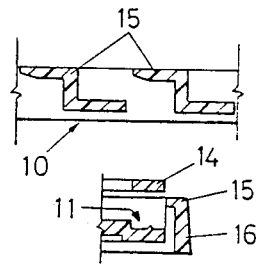
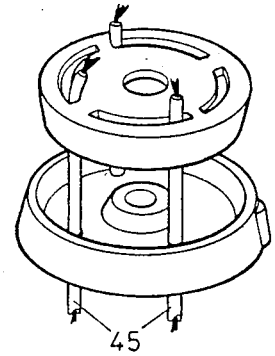

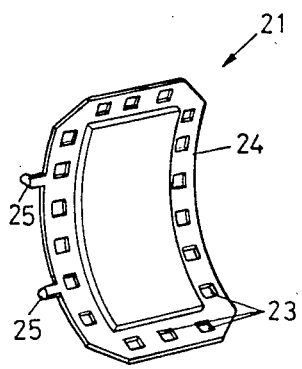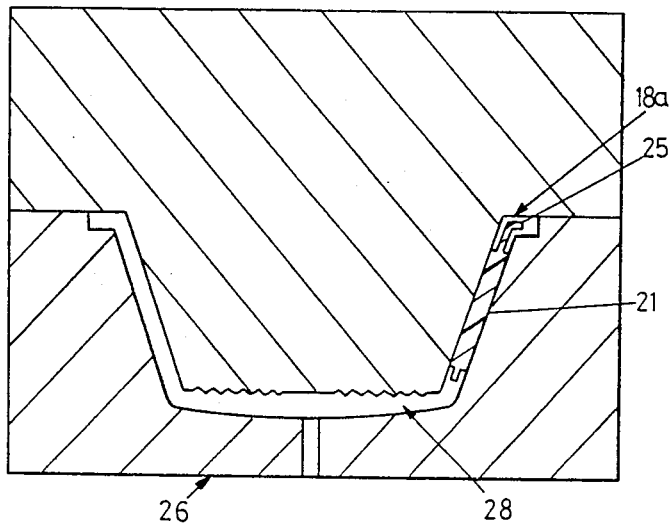

TAIL LIGHT ASSEMBLY

This invention relates to a tail light assembly which is useful for trailers which may require occasional immersion in water.

BACKGROUND OF THE INVENTION

One of the main problems encountered with boat trailers is that tail light assemblies presently available (and known to the applicant) are not waterproof to a satisfactory degree, and the main object of this invention is to provide a tail light assembly which is capable of immersion in water with much reduced likelihood of corrosion damage being inflicted upon the elements of the assembly.

Another problem is that many known tail light assemblies use acrylic, which is very fragile. Polycarbonate is a product known to be much stronger than acrylic, but although it has a notched Izod impact strength much greater than most other polymeric materials, it is nevertheless advisable to minimise stresses such as could be caused by uneven tightening of fastening screws during assembly of the lens to the base, to impart sufficient deflection to avoid ingress of moisture when immersed.

An object of the invention therefore is to provide an improved structure, which is capable of taking advantage of the valuable properties of polycarbonate but wherein the load is so spread that the stress is within such limits that none of the structure is likely to fracture under conditions of normal use.

BRIEF SUMMARY OF THE INVENTION

In this invention, a number of closely spaced Z-shaped projections on the base of a tail light assembly project radially inwardly towards a sealing ring, and are engaged by a corresponding number of lugs surrounding a tail light lens, to form a bayonet cap join wherein the pressure is distributed around the periphery of the lens, urging the lens into sealing contact with the sealing ring. In this invention there are at least six projections and six lugs.

In one embodiment of the invention, a tail light assembly comprises a base with peripheral walls defining an annular recess, an elastomeric sealing ring within said recess, a plurality of Z-shaped projections which are closely spaced from one another circumferentially and project radially inwardly into said recess from said peripheral walls towards the sealing ring, and a translucent lens having an annular lower surface and a plurality of radially outstanding lugs which engage respective said Z-shaped projections and effect sealing of the lens to the base by urging said annular base into engagement with the sealing ring.

This arrangement makes it possible to utilise a fully moulded product of polymeric material, which can for example be polycarbonate, wherein the space between the base and lens can be substantially water-tight, providing means whereby a lamp can be contained in an airspace even if the product is immersed, with a minimum danger of corrosion damage to the metal parts.

One of the most difficult problems to overcome is the connection of wires to terminals in a tail light assembly, and in an embodiment of the invention the rear of the base is provided with walls which define a recess, the recess having the ends of rivets projecting thereinto, the rivets extending through the base and retaining electrical contact members on the front of the base, there being provided a resilient disc of elastomeric material with apertures therethrough, and a clamp disc therebehind, the wires extending through aligned apertures in the clamp disc and the resilient disc, having insulation bared away from the wires within the recess, and being clamped into position against the rivet heads in surface-to-surface contact. This arrangement makes connection very easy and efficient, but in the clamping of the elastomeric disc, the elastic flow of the material of the disc causes sealing between the disc and walls of the recess and between the disc and wire insulating sheaths, the sealing being so effective that air is entrapped and will inhibit capillary migration of water within the insulating sheath and around the wires. Correct rotational location can be maintained by key and slot means.

One of the problems which is encountered with tail light assemblies is that of providing a translucent lens which may for example be red or orange, and of providing a transparent "window" in the side wall thereof, so that white light can shine for example on a number plate.

In an embodiment of this invention, there is provided a translucent "window" member of the same envelope shape as the side wall of a translucent lens, the window having a reduced section flange containing a plurality of apertures, and also having locating spigots, the lens being formed by fristly inserting the window in a die assembly, locating the window with its location spigots, closing the die assembly and injection moulding the translucent polymeric material around the periphery of the window to extend into and through the apertures in the flanges of the window. Surprisingly this has been found to provide a means whereby the interface between the transparent and translucent portions of the lens is a weld which is unlikely to fracture or otherwise allow the ingress of moisture.

DETAILED DESCRIPTION OF THE PREFERRED EMBODIMENT

An embodiment of the invention is described hereunder in some detail with reference to, and is illustrated in, the accompanying drawing in which:

FIG. 1 is an elevation of the base of the tail light assembly (with the lenses removed), FIG. 2 is a section taken on line 2—2 of FIG. 1, but showing the parts of the assembly in "exploded" view (including a lens), FIG. 3 is a planar representation of the Z-shaped projections of the base, taken on line 3—3 of FIG. 1, FIG. 4 is a fragmentary section taken on line 4—4 of FIG. 1, but showing the sealing ring lifted from its recess, FIG. 5 is a perspective view which illustrates elements of the wire connection means, FIG. 6 is a perspective view of a clear "window" panel, and FIG. 7 shows, in diagrammatic section, the moulding die for moulding a red lens about the window of FIG. 6.

In this embodiment a base 10 for a tail light assembly is moulded from polymeric material (polycarbonate) to have two annular recesses 11 on its front face, and a depending reflector plate 12.

Each annular recess 11 contains an elastomeric sealing ring (in this embodiment being of Monsanto "SANTOPRENE", an elastomer having a high degree of lubricity), and this is contained radially within a plurality of spaced Z-shaped projections 15 (at least six, and in this embodiment, eight in number), which project inwardly from a peripheral flange 16. The Z-shaped projections 15 are identical in shape and size with one another, and are so spaced that a lens 17 having a corresponding plurality of short outstanding lugs 18 thereon can be inserted and partly rotated such that the lens lugs 18 will engage the under surfaces of the upper portions of the Z-shaped projections 15 in a bayonet-type locking arrangement which will firmly compress the sealing ring 14 for its entire periphery, spreading the load and limiting development of stress concentration areas.

By forming the projections 15 to a Z-shape, the moulding of the projections is very simple, since the inner surfaces of the lands of the projections define the ends of axially extending recesses, and this shape enables use to be made of a die having male and female parts which separate in one direction only (that is, axially). This shape is best seen in FIG. 3.

There are two lenses 17, one of an orange or amber colour and the other of red colour, and the red lens 17 is provided with a transparent window 21 so that light from a globe 22 contained within the lens can shine outwardly, for example onto a number plate. This is achieved by firstly moulding a window 21 to have a plurality of apertures 23 extending through a reduced section peripheral flange 24, and also a pair of locating spigots 25 which locate in a lug forming recess 18a in a female die part 26 (FIG. 7), which co-operates with a male die part 27 to establish a moulding cavity 28. Translucent polymeric material (also polycarbonate) is then injection moulded such that the polymeric material extends through the apertures, welds to the material of the window, and mechanically locks it so that there is little danger of fracture such as would allow ingress of moisture.

Centrally of each recess 11 in base 10 there is a respective inwardly directed projection 31 which has rivetted to it at least one pair of contact strips (all designated 32) for supporting a respective light globe. In this embodiment there are three rivets 33, and these extend through the discoid portion of the projection and into a corresponding recess 34 in the back surface of the base 10. The rivets 33 are not of the hollow type but are in firm non-pervious contact with the surfaces of the base, and in this embodiment use is made of small resilient washers (not shown) to ensure against ingress of moisture from the rear.

The recess 34 in the wall of the base contains a disc 37 of rubber or other elastomer, having a wall 33 which is located within the recess side walls 39, the wall 38 engaging the inner surface of a flange 40 of a clamping disc 41 of comparatively rigid material, the disc 41 having a key 42 which engages in a slot 43 in wall 39 of recess 34. The two discs are clamped in tandem within the recess 34 in the rear of the base 10 for each of the two lamps, but the discs also contain aligned apertures through which pass the insulated wires 45 for carrying electrical energy to the lamps. These wires 45 have the insulation removed within the recess, and the resilience of the rubber is such that the wires are pressed into firm contact with respective heads of the rivets 33 which secure the contact strips 32. A single central screw is utilised for this purpose. This screw does not extend into the space within the lenses thus preventing moisture from entering those spaces from this point.

In order to prevent inadvertent removal of the lenses, there is provided a U-section retention block 50 (shown in both cross-section and elevation in FIG. 2), the block 50 having a pair of diagonally opposite nibs 51 which releasably engage in respective recesses defined by the Z-shaped projections 15, and, when so engaged, inhibit rotation of the lenses 17, thereby preventing release.

A consideration of the above embodiment will indicate that this simple invention provides means whereby danger of corrosion is greatly reduced, since the tail light assembly is impervious, or substantially impervious, against entry of water which will otherwise rapidly cause corrosion.

Surprisingly, it has been found that the clamping effect around the wires 45 by the rubber disc 37 effects such a good seal that the recesses become small airtight chambers, and since the air cannot escape these chambers, migration of moisture by capillary action within the insulating sheaths and around the wires is inhibited.

Clearly, improvements can be made such as use of silicone grease to further inhibit the water flow into the device. The material used for the base and lenses can vary widely amongst known materials, but it is considered desirable that it should be of a rugged type, for example polycarbonate which will resist permanent distortion, withstand weathering particularly well and which will also withstand some shock, but nevertheless return to its original shape.

I claim:

1. A tail light assembly having a base with peripheral walls defining an annular recess, an elastomeric sealing ring within said recess, a plurality of Z-shaped projections which are closely spaced from one another circumferentially, and project radially inwardly into said recess from said peripheral walls towards the sealing ring, and a translucent lens having an annular lower surface and a plurality of radially outstanding lugs which engage respective said Z-shaped projections and effect sealing of the lens to the base by urging said annular base into engagement with the sealing ring.

2. A tall light assembly according to claim 1 wherein said translucent lens comprises a transparent window having a reduced section peripheral flange containing a plurality of apertures therethrough, and a plurality of locating spigots which extend outwardly from the flange, the polymeric material of the transparent window and lens being the same, and the lens being moulded around the flange and locating spigots to thereby mechanically lock and simultaneously weld the lens to the window.

3. A tail light assembly according to claim 1 further comprising electric globe carrying means within the lens, rivets extending through the base to be watertight therewith, and mechanically fastening the globe carrying means to the base, and clamping means clamping joining wires in contact with heads of said rivets at the rear of said base.

4. A tail light assembly according to claim 3 wherein said clamping means comprise a disc of elastomeric material, a clamping disc of relatively rigid material, aligned apertures in said discs through which said wires extend, and a clamping screw extending through said discs and threadably engaging an aperture in said base to thereby effect said clamping of the joining wires in contact with said rivet heads, and simultaneously distort said elastomeric disc to seal against the rear surface of said base.

5. A tail light assembly according to claim 1, comprising a pair of said lenses carried side-by-side on said base, and a U-shaped retention rib between the lenses, the retention rib releasably engaging surfaces of adjacent said Z-shaped projections and inhibiting rotation of either of the lenses.

6. A tail light assembly according to claim 1, wherein all said polymeric material is polycarbonate.

* * * * *